June 20, 1967 L. G. H. ROCKEY 3,327,140
ELECTRICAL VOLTAGE COMPARATOR CIRCUITS
Filed Nov. 3, 1964
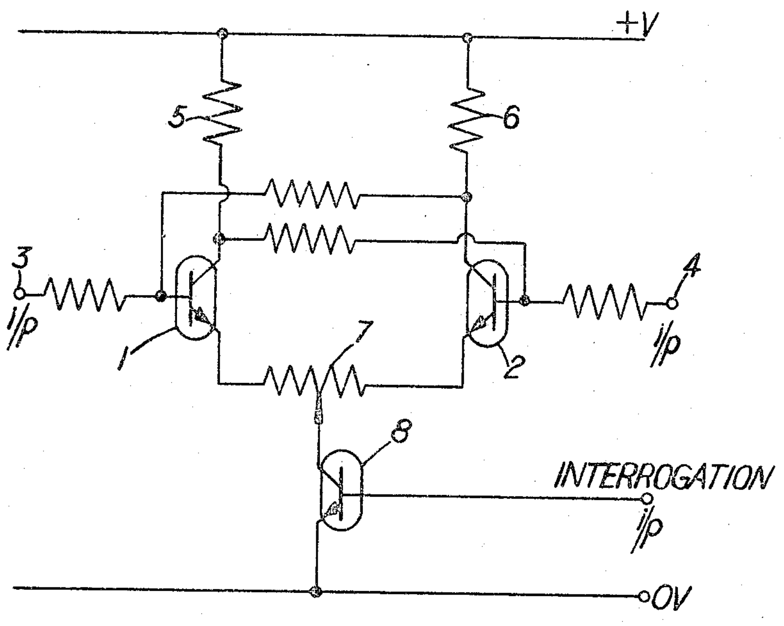
Inventor
LESLIE GEORGE HENRY ROCKEY
By Bailey, Stephens & Huettig
Attorneys United States Patent Office 3,327,140
Patented June 20, 1967

3,327,140
ELECTRICAL VOLTAGE COMPARATOR CIRCUITS

Leslie George Henry Rockey, Westbury-on-Trym, Bristol, England, assignor to British Aircraft Corporation (Operating) Limited, London, England, a British company Filed Nov. 3, 1964, Ser. No. 408,626
Claims priority, application Great Britain, Nov. 6, 1963, 43,840/63
4 Claims. (Cl. 307—88.5)

This invention relates to methods and circuits for making a comparison between two electrical potentials.

Bistable circuits including two electronic devices connected between electrical supply lines and interconnected by feed-back circuits so that either one of other electronic device is conductive, providing the two stable states, are extremely well known. They are employed to provide an output signal representing an electrical potential applied to one or other of the devices as a biasing input signal, the transition of the input signal through a predetermined electric potential causing the condition of the device to which it is applied to be reversed (either switched from a cut-off condition to a conductive condition or vice versa) and the feed-back circuits automatically causing the condition of the other device to be reversed and the state of the bistable circuit thus changed.

According to the present invention, the two potentials to be compared are applied as biasing potentials to opposite sides of an otherwise substantially electrically balanced bistable circuit while the circuit is disconnected from its electrical supply; the electrical supply is then connected to the circuit causing the circuit to assume that one of its stable states to which it is biased by the relative values of the biasing potentials and remain in that state until the supply is again disconnected and an output signal is derived representing the stable state assumed by the bistable circuit. When the electrical supply is connected, positive feed-back in the bistable circuit enhances the effect of the biasing potentials to drive the circuit into the one of its stable states determined by the relative values of the biasing potentials and, therefore, a method according to the present invention is highly sensitive to differences in the biasing potentials and enables a standard bistable circuit to be employed as a sensitive comparator circuit. Such a comparator circuit is extremely simple which is a great advantage when the problem of miniaturisation is considered. A particularly useful application of a comparator circuit employing a method embodying the present invention is in an analogue to digital converter operating on the "step-by-step" principle of successive approximation. Converters operating on this principle are well known, many different types having been developed, and each necessarily includes a comparator circuit for comparing an analogue input current with successive collective reference currents to determine whether the reference current exceeds or falls below the value of the analogue input current and to adjust the reference current accordingly. In a converter operating on this principle in which the more significant stages are considered first, a comparator amplifier circuit is connected to a current summing line arranged to receive a collective reference current determined by the conditions of successive bistable stages of a series constituting the main register of the converter. Whenever a bistable stage is called which causes the collective reference currents to exceed the analogue input current a reject pulse is generated by the comparator circuit which switches off that particular main register bistable circuit thereby reducing the total reference current to a level below that of the input current. Conversely, if the collective reference current is too small no reject pulse is produced by the comparator and the particular bistable circuit of the main register is left in the accepted state. The bistable stages of the main register are sampled successively so that the respective states of the register after a cycle of sampling operations provides a binary coded representation of the analogue input signal. Since circuits operating on this principle are well known no attempt will be made to describe a particular circuit in the present application. Previous analogue to digital converters of this type have employed different types of comparator circuits all of which are considerably more complicated than a circuit employing a method of comparison embodying the present invention.

In order that the invention may be more clearly understood a particular example embodying the invention of a method of comparing two electrical potentials will now be described with reference to the accompanying drawing which is a diagram of a conventional bistable circuit.

The circuit comprises two NPN transistors 1 and 2, the base electrodes of which are arranged to receive the two electrical potentials to be compared from input terminals 3 and 4 respectively. The collector electrodes of the two transistors are connected through substantially equal load resistors 5 and 6 to a common source of positive supply potential and the base electrode of each transistor is connected through a resistor to the collector electrode of the other. The emitter electrodes are interconnected through a balance potentiometer 7, the adjustable contact of which is arranged to be connected to a source of earth potential via the emitter-collector electrode circuit of a transistor switch 8 upon application of an interrogation input signal at the base electrode of the transistor switch 8 which biases the switch into its conductive state. Whilst the interrogation supply switching transistor is non-conductive the differential input signal applid to terminals 3 and 4 biases the transistors 1 and 2 of the bistable circuit so that one will have greater tendency to conduct than the other. Subsequent operation of the interrogation switching transistor 8 causes it to become conductive and connect a common supply potential across each of the transistors 1 and 2 of the bistable circuit simultaneously. The transistor having a greater tendency to conduct then becames conductive under the influence of the biasing potential and a positive feed-back effect in the circuit. The comparator circuit will remain in this state for the duration of the interrogation switching voltage pulse holding the switching transistor 8 conductive thereby connecting the supply potential across the transistors 1 and 2. Thus, a change in the sense of the differential input voltage applied to input terminals 3 and 4 would not be detected until the next cycle of the interrogation switching voltage applied to transistor 8 when the opposite transistor of the bistable circuit would be rendered conductive, provided the altered differential condition existed immediately before the next switching of the interrogation transistor 8 and consequent application of the supply potential. Output signals may be taken from the collector electrodes of either transistor 1 or 2, the collector electrode of the conducting transistor, i.e. the transistor which received the more positive differential input signal at its base electrode immediately before the application of the interrogation supply potential to the base of switching transistor 8, being more negative in value.

Certain modifications could of course be made to the specific example illustrated in the drawings. For example, different forms of switches could be used for switching the supply signal and/or the differential input signals could be connected to different points of the bistable circuit to bias the circuit out of its balance condition before application of the supply potentials. For example, the biasing signals could be derived from a variable capacitor producing a differential capacitance between the collector electrodes of the otherwise symmetrical circuit, thus enabling a mechanical positional variation of capacitor plates to control the comparator circuit. If desired PNP transistors could be used in place of the NPN transistors shown in the drawing provided the polarities of the supply potentials were reversed. Furthermore, the device for connecting the supply potential across the transistors of the bistable circuit could be included in the common collector circuit of both transistors instead of in the emitter circuit.

Two more important applications of a comparator circuit of the kind described embodying the present invention are as an analogue voltage off-limit detector in a digital-analogue converter, and for accurate pulse amplitude comparison in which the comparator is employed to compare the amplitude of a pulse under investigation at successive positions along its contour with a voltage of standard amplitude.

I claim:

1. A method of making a comparison between two electrical potentials, comprising: firstly, applying the two potentials to be compared as biasing potentials to opposite sides of an otherwise substantially electrically balanced bistable circuit while the circuit is disconnected from its electrical supply, secondly, connecting the electrical supply to the circuit and thus causing the circuit to assume that one of its stable states to which it is biased by the relative values of the biasing potentials and to remain in that state until the supply is again disconnected and deriving an output signal representing the stable state assumed by the bistable circuit.

2. A comparator circuit including a bistable circuit, comprising two substantially electrically identical halves, each including an electronic device and a feedback path connecting its electronic device with the electronic device of the other half; means for applying two signals to be compared as biasing signals respectively to the electronic devices in each half of the bistable circuit and means for intermittently connecting an electrical supply potential symmetrically across the two electronic devices arranged in parallel, whereby, upon each application of the supply potential, one or other of the electronic devices, determined by the relative values immediately prior to application of the supply potential of the biasing input signals to be compared, becomes conductive while the remaining electronic device remains non-conductive, and further including means for deriving an output signal representing which electronic device becomes conductive upon application of the supply potential.

3. A comparator circuit according to claim 2, in which a transistor constitutes the device for intermittently connecting an electrical supply potential across the two electronic devices, the collector-emitter circuit of the transistor being connected in series with the devices and a source of electrical supply potential and the base electrode being arranged to receive a pulsed input signal for intermittently biasing the transistor into its conductive state and thus connecting the devices to the source of supply potential.

4. A comparator circuit according to claim 2 including a potentiometer and means for intermittently connecting the source of electrical supply potential to the movable contact of the potentiometer and connecting the electronic devices of the bistable circuit symmetrically to opposite ends of the fixed resistor of the potentiometer, whereby any deviation from electrical balance in the two halves of the circuit, in the absence of differential biasing potentials to be compared, may be overcome by adjusting the movable contact of the potentiometer.

References Cited

UNITED STATES PATENTS

| | | | |
|---|---|---|---|
| 2,736,878 | 2/1956 | Boyle | 307—88.5 X |
| 3,178,592 | 3/1965 | Fisher | 307—88.5 |

OTHER REFERENCES

Clapper: "Gated Comparison Circuit," I.B.M. Technical Disclosure Bulletin, v. 6, No. 9, 2/1964, (pg. 69, 70) (pg. 69 relied on), copy in Pat. Off. Sci. Library.

ARTHUR GAUSS, *Primary Examiner.*

D. D. FORRER, *Assistant Examiner.*